(12) United States Patent
Pike et al.

(10) Patent No.: US 10,984,374 B2
(45) Date of Patent: Apr. 20, 2021

(54) METHOD AND SYSTEM FOR INPUTTING PRODUCTS INTO AN INVENTORY SYSTEM

(71) Applicant: Vocollect, Inc., Pittsburgh, PA (US)

(72) Inventors: Jeffrey Pike, Murrysville, PA (US); Lori Pike, Murrysville, PA (US); Mark Mellott, Pittsburgh, PA (US); Vanessa Cassandra Sanchez, Pittsburgh, PA (US); George Joshue Karabin, Pittsburgh, PA (US); Brian Bender, Jeannette, PA (US); Justin Volz, Verona, PA (US)

(73) Assignee: Vocollect, Inc., Pittsburgh, PA (US)

(*) Notice: Subject to any disclaimer, the term of this patent is extended or adjusted under 35 U.S.C. 154(b) by 264 days.

(21) Appl. No.: 15/860,755

(22) Filed: Jan. 3, 2018

(65) Prior Publication Data

US 2018/0232688 A1    Aug. 16, 2018

Related U.S. Application Data

(60) Provisional application No. 62/457,242, filed on Feb. 10, 2017.

(51) Int. Cl.
*G06Q 10/08* (2012.01)
*G06K 7/10* (2006.01)
*G06K 7/14* (2006.01)

(52) U.S. Cl.
CPC ....... *G06Q 10/087* (2013.01); *G06K 7/10722* (2013.01); *G06K 7/1413* (2013.01); *G06K 7/1417* (2013.01)

(58) Field of Classification Search
CPC .. G06Q 10/087; G06Q 10/08; G06K 7/10722; G06K 7/1413; G06K 7/1417; G06K 7/14; G06K 7/10
(Continued)

(56) References Cited

U.S. PATENT DOCUMENTS 6,341,269 B1 * 1/2002 Dulaney ............. G06Q 10/087
                                                                705/22
6,832,725 B2  12/2004 Gardiner et al.
(Continued)

FOREIGN PATENT DOCUMENTS

WO    2013163789 A1   11/2013
WO    2015/195415 A1  12/2015

OTHER PUBLICATIONS

Extended Search Report in related European Application No. 18156172.1 dated Mar. 22, 2018, pp. 1-7.
(Continued)

*Primary Examiner* — Andrew Joseph Rudy
(74) *Attorney, Agent, or Firm* — Alston & Bird LLP

(57) ABSTRACT

A method of characterizing inventory items to a planogram includes receiving images of view of a scene with inventory items and corresponding indicia using an imaging device; receiving utterances (such as spoken description of inventory items) from a user using a voice recognition system; identifying inventory items in the scene and a corresponding identification code based at least in part on the images and at least in part on the utterances; identifying a plurality of attributes corresponding to the inventory items; and characterizing the inventory items to a planogram based on the respective identification code and plurality of attributes.

20 Claims, 2 Drawing Sheets

(58) Field of Classification Search
USPC .......................................................... 705/28
See application file for complete search history.

(56) References Cited

U.S. PATENT DOCUMENTS

| | | | |
|---|---|---|---|
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 7,750,817 B2* | 7/2010 | Teller | G07F 13/04 |
| | | | 340/666 |
| 7,801,778 B2* | 9/2010 | Fox | G06Q 30/0205 |
| | | | 705/28 |
| 8,032,392 B2* | 10/2011 | Brennan | G06Q 10/06 |
| | | | 705/1.1 |
| 8,214,313 B1* | 7/2012 | Puskorius | G06Q 10/087 |
| | | | 706/28 |
| 8,249,955 B2* | 8/2012 | Gross | G06Q 10/06 |
| | | | 705/28 |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |

(56) References Cited

U.S. PATENT DOCUMENTS

| | | | |
|---|---|---|---|
| 8,903,172 B2 | 12/2014 | Smith |
| 8,908,995 B2 | 12/2014 | Benos et al. |
| 8,910,870 B2* | 12/2014 | Li | G06K 7/14 235/462.01 |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,934,923 B1* | 1/2015 | Golden | A01K 15/023 455/457 |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |

(56) References Cited

U.S. PATENT DOCUMENTS

| | | |
|---|---|---|
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| 9,424,598 B1 * | 8/2016 | Kraft ................ H04W 4/025 |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,805,402 B1 * | 10/2017 | Maurer ................ G06Q 10/087 |
| 10,423,923 B2 * | 9/2019 | Harsha ................ G06Q 10/087 |
| 2003/0158796 A1 * | 8/2003 | Balent ................ G06Q 10/087 705/28 |
| 2003/0212643 A1 * | 11/2003 | Steele ................ G06Q 10/10 705/400 |
| 2007/0063048 A1 | 3/2007 | Havens et al. |
| 2008/0147475 A1 * | 6/2008 | Gruttadauria ........ G06Q 10/087 705/7.31 |
| 2009/0134221 A1 | 5/2009 | Zhu et al. |
| 2009/0276317 A1 * | 11/2009 | Dixon ................ G06Q 10/087 705/14.61 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2013/0018696 A1 * | 1/2013 | Meldrum ................ G06Q 10/06 705/7.27 |
| 2013/0037613 A1 | 2/2013 | Soldate |
| 2013/0043312 A1 | 2/2013 | Van Horn |
| 2013/0075168 A1 | 3/2013 | Amundsen et al. |
| 2013/0076726 A1 * | 3/2013 | Ferrara ................ G06K 9/60 345/418 |
| 2013/0173435 A1 * | 7/2013 | Cozad, Jr. ............ G06Q 10/087 705/28 |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0003727 A1 | 1/2014 | Lortz et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |

(56) References Cited

U.S. PATENT DOCUMENTS

| | | | |
|---|---|---|---|
| 2014/0247315 A1 | 9/2014 | Marty et al. | |
| 2014/0263493 A1 | 9/2014 | Amurgis et al. | |
| 2014/0263645 A1 | 9/2014 | Smith et al. | |
| 2014/0270196 A1 | 9/2014 | Braho et al. | |
| 2014/0270229 A1 | 9/2014 | Braho | |
| 2014/0278387 A1 | 9/2014 | DiGregorio | |
| 2014/0282210 A1 | 9/2014 | Bianconi | |
| 2014/0288933 A1 | 9/2014 | Braho et al. | |
| 2014/0297058 A1 | 10/2014 | Barker et al. | |
| 2014/0299665 A1 | 10/2014 | Barber et al. | |
| 2014/0304123 A1* | 10/2014 | Schwartz | G06Q 10/087 705/28 |
| 2014/0332590 A1 | 11/2014 | Wang et al. | |
| 2014/0351317 A1 | 11/2014 | Smith et al. | |
| 2014/0362184 A1 | 12/2014 | Jovanovski et al. | |
| 2014/0363015 A1 | 12/2014 | Braho | |
| 2014/0369511 A1 | 12/2014 | Sheerin et al. | |
| 2014/0374483 A1 | 12/2014 | Lu | |
| 2014/0374485 A1 | 12/2014 | Xian et al. | |
| 2015/0001301 A1 | 1/2015 | Ouyang | |
| 2015/0009338 A1 | 1/2015 | Laffargue et al. | |
| 2015/0014416 A1 | 1/2015 | Kotlarsky et al. | |
| 2015/0021397 A1 | 1/2015 | Rueblinger et al. | |
| 2015/0028104 A1 | 1/2015 | Ma et al. | |
| 2015/0029002 A1 | 1/2015 | Yeakley et al. | |
| 2015/0032709 A1 | 1/2015 | Maloy et al. | |
| 2015/0039309 A1 | 2/2015 | Braho et al. | |
| 2015/0040378 A1 | 2/2015 | Saber et al. | |
| 2015/0046299 A1* | 2/2015 | Yan | G06Q 10/087 705/28 |
| 2015/0049347 A1 | 2/2015 | Laffargue et al. | |
| 2015/0049902 A1* | 2/2015 | Moraleda | G06K 9/4619 382/103 |
| 2015/0051992 A1 | 2/2015 | Smith | |
| 2015/0053769 A1 | 2/2015 | Thuries et al. | |
| 2015/0062366 A1 | 3/2015 | Liu et al. | |
| 2015/0063215 A1 | 3/2015 | Wang | |
| 2015/0088522 A1 | 3/2015 | Hendrickson et al. | |
| 2015/0088703 A1* | 3/2015 | Yan | G06F 3/147 705/28 |
| 2015/0096872 A1 | 4/2015 | Woodburn | |
| 2015/0100196 A1 | 4/2015 | Hollifield | |
| 2015/0115035 A1 | 4/2015 | Meier et al. | |
| 2015/0127791 A1 | 5/2015 | Kosecki et al. | |
| 2015/0128116 A1 | 5/2015 | Chen et al. | |
| 2015/0133047 A1 | 5/2015 | Smith et al. | |
| 2015/0134470 A1 | 5/2015 | Hejl et al. | |
| 2015/0136851 A1 | 5/2015 | Harding et al. | |
| 2015/0142492 A1 | 5/2015 | Kumar | |
| 2015/0144692 A1 | 5/2015 | Hejl | |
| 2015/0144698 A1 | 5/2015 | Teng et al. | |
| 2015/0149946 A1 | 5/2015 | Benos et al. | |
| 2015/0161429 A1 | 6/2015 | Xian | |
| 2015/0178523 A1 | 6/2015 | Gelay et al. | |
| 2015/0178537 A1 | 6/2015 | El et al. | |
| 2015/0178685 A1 | 6/2015 | Krumel et al. | |
| 2015/0181109 A1 | 6/2015 | Gillet et al. | |
| 2015/0186703 A1 | 7/2015 | Chen et al. | |
| 2015/0199957 A1 | 7/2015 | Funyak et al. | |
| 2015/0210199 A1 | 7/2015 | Payne | |
| 2015/0212565 A1 | 7/2015 | Murawski et al. | |
| 2015/0213647 A1 | 7/2015 | Laffargue et al. | |
| 2015/0220753 A1 | 8/2015 | Zhu et al. | |
| 2015/0220901 A1 | 8/2015 | Gomez et al. | |
| 2015/0227189 A1 | 8/2015 | Davis et al. | |
| 2015/0236984 A1 | 8/2015 | Sevier | |
| 2015/0239348 A1 | 8/2015 | Chamberlin | |
| 2015/0242658 A1 | 8/2015 | Nahill et al. | |
| 2015/0248572 A1 | 9/2015 | Soule et al. | |
| 2015/0254485 A1 | 9/2015 | Feng et al. | |
| 2015/0261643 A1 | 9/2015 | Caballero et al. | |
| 2015/0264624 A1 | 9/2015 | Wang et al. | |
| 2015/0268971 A1 | 9/2015 | Barten | |
| 2015/0269402 A1 | 9/2015 | Barber et al. | |
| 2015/0288689 A1 | 10/2015 | Todeschini et al. | |
| 2015/0288896 A1 | 10/2015 | Wang | |
| 2015/0310243 A1 | 10/2015 | Ackley | |
| 2015/0310244 A1 | 10/2015 | Xian et al. | |
| 2015/0310389 A1 | 10/2015 | Crimm et al. | |
| 2015/0312780 A1 | 10/2015 | Wang et al. | |
| 2015/0327012 A1 | 11/2015 | Bian et al. | |
| 2016/0014251 A1 | 1/2016 | Hejl | |
| 2016/0025697 A1 | 1/2016 | Alt et al. | |
| 2016/0026838 A1 | 1/2016 | Gillet et al. | |
| 2016/0026839 A1 | 1/2016 | Qu et al. | |
| 2016/0040982 A1 | 2/2016 | Li et al. | |
| 2016/0042241 A1 | 2/2016 | Todeschini | |
| 2016/0057230 A1 | 2/2016 | Todeschini et al. | |
| 2016/0062473 A1 | 3/2016 | Bouchat et al. | |
| 2016/0073886 A1* | 3/2016 | Connor | A61B 5/6887 600/475 |
| 2016/0092805 A1 | 3/2016 | Geisler et al. | |
| 2016/0101936 A1 | 4/2016 | Chamberlin | |
| 2016/0102975 A1 | 4/2016 | McCloskey et al. | |
| 2016/0104019 A1 | 4/2016 | Todeschini et al. | |
| 2016/0104274 A1 | 4/2016 | Jovanovski et al. | |
| 2016/0109219 A1 | 4/2016 | Ackley et al. | |
| 2016/0109220 A1 | 4/2016 | Laffargue | |
| 2016/0109224 A1 | 4/2016 | Thuries et al. | |
| 2016/0112631 A1 | 4/2016 | Ackley et al. | |
| 2016/0112643 A1 | 4/2016 | Laffargue et al. | |
| 2016/0117627 A1 | 4/2016 | Raj et al. | |
| 2016/0119540 A1* | 4/2016 | Wu | G06Q 10/087 348/38 |
| 2016/0124516 A1 | 5/2016 | Schoon et al. | |
| 2016/0125217 A1 | 5/2016 | Todeschini | |
| 2016/0125342 A1 | 5/2016 | Miller et al. | |
| 2016/0133253 A1 | 5/2016 | Braho et al. | |
| 2016/0171597 A1 | 6/2016 | Todeschini | |
| 2016/0171666 A1 | 6/2016 | McCloskey | |
| 2016/0171720 A1 | 6/2016 | Todeschini | |
| 2016/0171775 A1 | 6/2016 | Todeschini et al. | |
| 2016/0171777 A1 | 6/2016 | Todeschini et al. | |
| 2016/0174674 A1 | 6/2016 | Oberpriller et al. | |
| 2016/0178479 A1 | 6/2016 | Goldsmith | |
| 2016/0178685 A1 | 6/2016 | Young et al. | |
| 2016/0178707 A1 | 6/2016 | Young et al. | |
| 2016/0179132 A1 | 6/2016 | Harr et al. | |
| 2016/0179143 A1 | 6/2016 | Bidwell et al. | |
| 2016/0179368 A1 | 6/2016 | Roeder | |
| 2016/0179378 A1 | 6/2016 | Kent et al. | |
| 2016/0180130 A1 | 6/2016 | Bremer | |
| 2016/0180133 A1 | 6/2016 | Oberpriller et al. | |
| 2016/0180136 A1 | 6/2016 | Meier et al. | |
| 2016/0180594 A1 | 6/2016 | Todeschini | |
| 2016/0180663 A1 | 6/2016 | McMahan et al. | |
| 2016/0180678 A1 | 6/2016 | Ackley et al. | |
| 2016/0180713 A1 | 6/2016 | Bernhardt et al. | |
| 2016/0185136 A1 | 6/2016 | Ng et al. | |
| 2016/0185291 A1 | 6/2016 | Chamberlin | |
| 2016/0186926 A1 | 6/2016 | Oberpriller et al. | |
| 2016/0188861 A1 | 6/2016 | Todeschini | |
| 2016/0188939 A1 | 6/2016 | Sailors et al. | |
| 2016/0188940 A1 | 6/2016 | Lu et al. | |
| 2016/0188941 A1 | 6/2016 | Todeschini et al. | |
| 2016/0188942 A1 | 6/2016 | Good et al. | |
| 2016/0188943 A1 | 6/2016 | Linwood | |
| 2016/0188944 A1 | 6/2016 | Wilz et al. | |
| 2016/0189076 A1 | 6/2016 | Mellott et al. | |
| 2016/0189087 A1 | 6/2016 | Morton et al. | |
| 2016/0189088 A1 | 6/2016 | Pecorari et al. | |
| 2016/0189092 A1* | 6/2016 | George | G06Q 10/087 705/28 |
| 2016/0189284 A1* | 6/2016 | Mellott | G06Q 30/0639 705/26.9 |
| 2016/0189288 A1 | 6/2016 | Todeschini | |
| 2016/0189366 A1 | 6/2016 | Chamberlin et al. | |
| 2016/0189443 A1 | 6/2016 | Smith | |
| 2016/0189447 A1 | 6/2016 | Valenzuela | |
| 2016/0189489 A1 | 6/2016 | Au et al. | |
| 2016/0191684 A1 | 6/2016 | DiPiazza et al. | |
| 2016/0192051 A1 | 6/2016 | DiPiazza et al. | |
| 2016/0125873 A1 | 7/2016 | Braho et al. | |
| 2016/0202951 A1 | 7/2016 | Pike et al. | |

(56) References Cited

U.S. PATENT DOCUMENTS

| | | |
|---|---|---|
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0350708 A1* | 12/2016 | Jones .................. G06Q 10/087 |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0011333 A1* | 1/2017 | Greiner .................. B64D 47/08 |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delano et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2017/0206547 A1* | 7/2017 | Vise .................. H04N 21/26258 |

OTHER PUBLICATIONS

Office Action for European Application No. 18156172.1 dated Jul. 29, 2019, 6 pages.

Summons to Attend Oral Proceedings for European Application No. 18156172.1, dated Feb. 6, 2020, 7 pages.

* cited by examiner

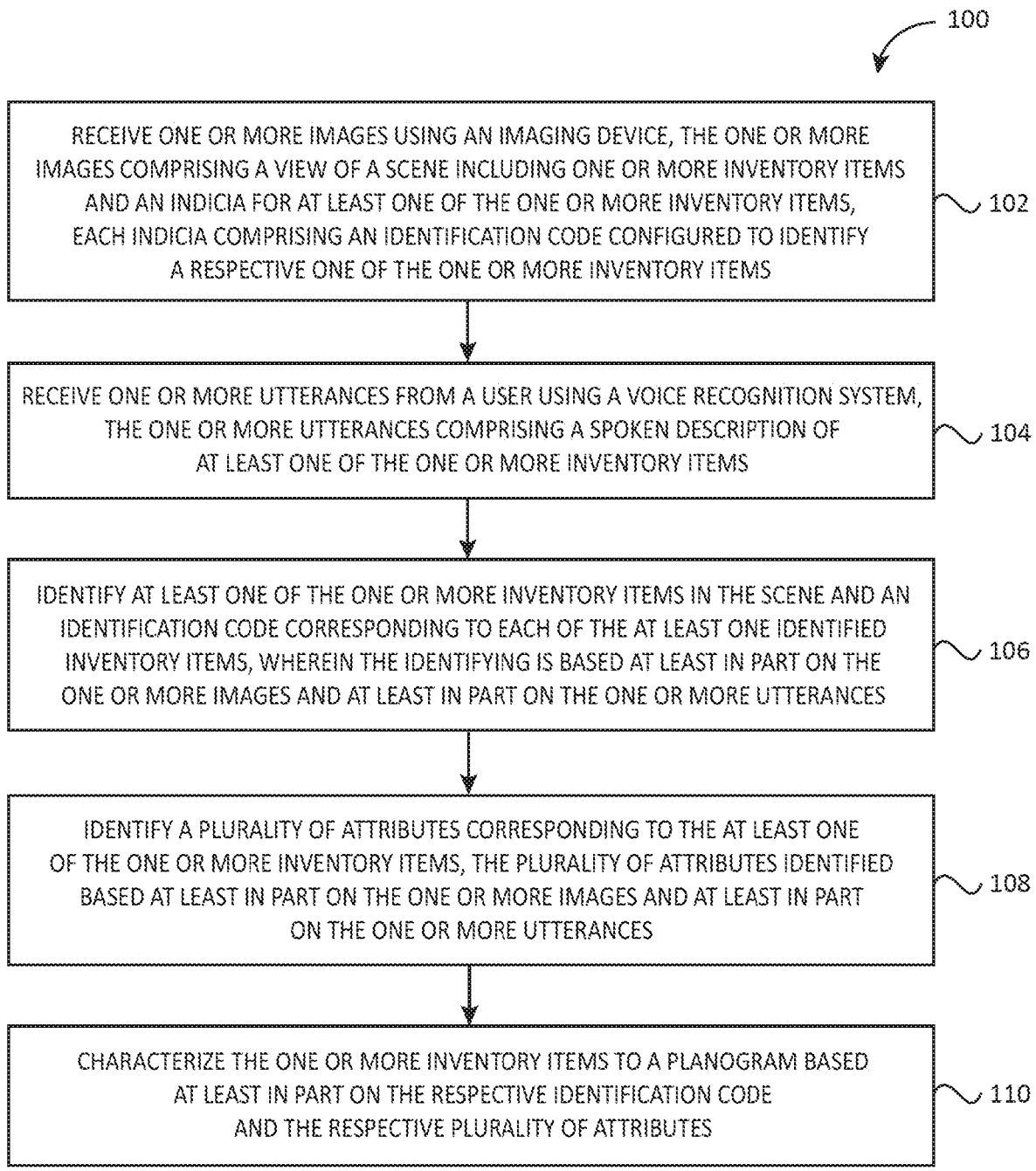

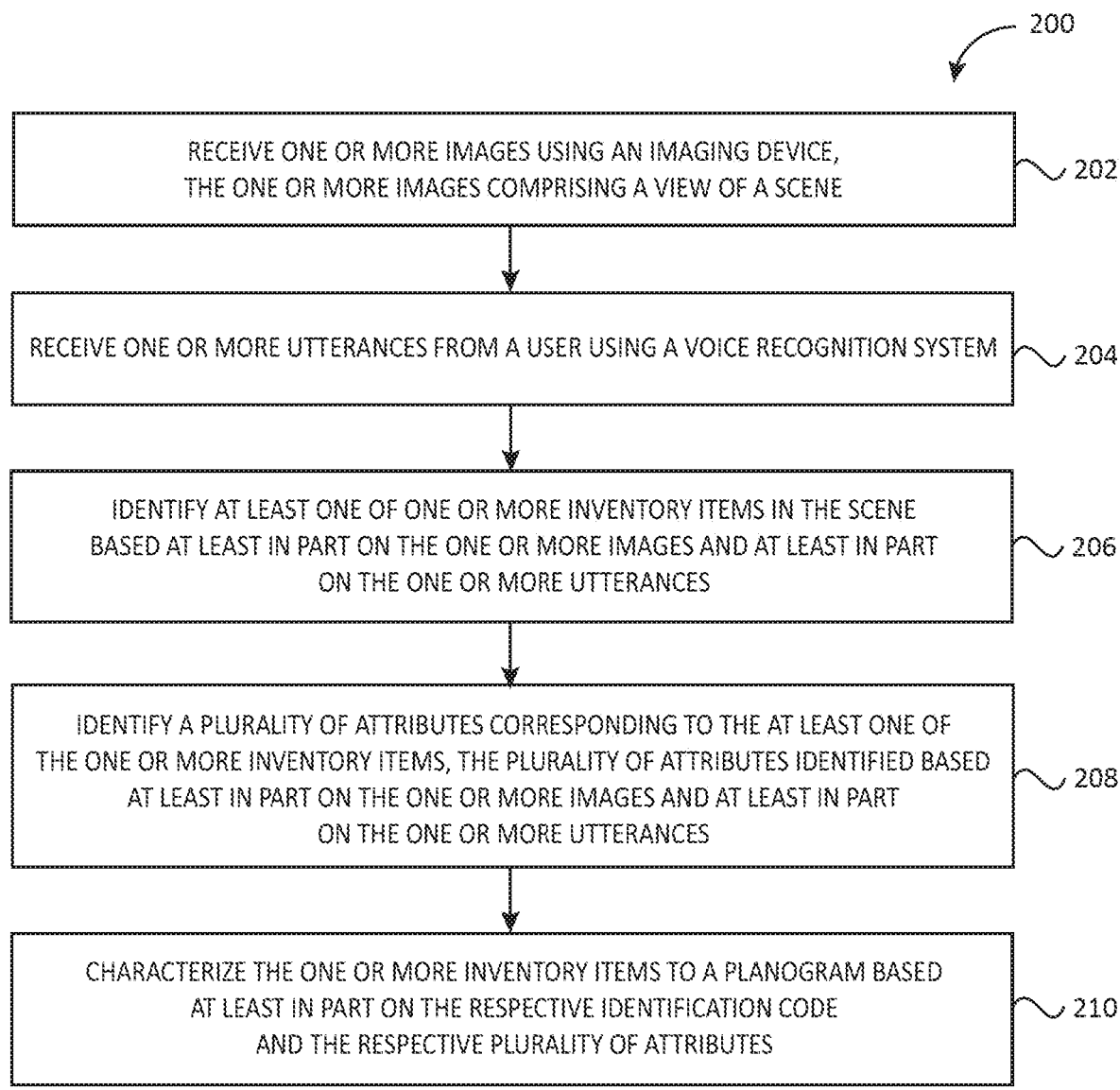

METHOD AND SYSTEM FOR INPUTTING PRODUCTS INTO AN INVENTORY SYSTEM

CROSS-REFERENCE TO RELATED APPLICATION

The present application claims the benefit of U.S. Patent Application No. 62/457,242 for a Method and System for Inputting Products into an Inventory System filed Feb. 10, 2017, which is hereby incorporated by reference in its entirety.

FIELD OF THE INVENTION

The present invention relates to inventory systems.

BACKGROUND

Generally speaking, entering product information into a newly installed retail system heavily relies on importing data from an external database or entering all the information manually. To address situations when such information is missing or incomplete, a more efficient solution is required.

Some attempts have been made to resolve this issue. For example, U.S. Pat. Appl. No. 20,130,173,435 by Cozad discloses systems and methods for managing product location information. The application focuses on scanning item identifiers corresponding to items on the shelves of a store, and creating a planogram of a store when necessary. U.S. Pat. App. No. 20,130,037,613 by Soldate discloses apparatus, system, and method to stock product and maintain inventory, and focuses on providing instructions to correctly stock a product, providing a next task upon completion of the stocking, and updating an inventory database based on completion of the stocking. A user provides stocking confirmation by scanning device or through voice input, and updates inventory management database by stocking product to a particular location using scanners or other handheld devices. U.S. Pat. App. No. 20,140,003,727 by Lortz et al. discloses image-augmented inventory management and wayfinding. The application focuses on receiving a query regarding an establishment, retrieving an output image from an image database in response to the query, and transmitting the output image to a mobile device. However, none of the references explicitly mentions a workflow capable of allowing a user to direct an employee to describe location of retail inventory, especially using verbal commands on the go, along with configuring or updating a database of the inventory management system.

Therefore, a need exists for a method and system for efficiently entering product information into an inventory system.

SUMMARY

Accordingly, the present invention embraces methods for inputting products into an inventory system.

In an exemplary embodiment, a method of characterizing one or more inventory items to a planogram includes receiving images using an imaging device, the images including a view of a scene with inventory items and an indicia for the inventory items, each indicia comprising an identification code configured to identify a respective inventory item; receiving utterances (such as spoken description of inventory items) from a user using a voice recognition system; identifying inventory items in the scene and an identification code corresponding to each of the identified inventory items; identifying a plurality of attributes corresponding to the inventory items; and characterizing the inventory items to a planogram based at least in part on the respective identification code and the respective plurality of attributes.

In another exemplary embodiment, a method of characterizing inventory items to a planogram includes receiving images using an imaging device, the images including a view of a scene; receiving utterances from a user using a voice recognition system; identifying at least one of inventory items in the scene based at least in part on the images and at least in part on the utterances; identifying a plurality of attributes corresponding to the inventory items, the plurality of attributes identified based at least in part on the images and at least in part on the utterances; and characterizing the inventory items to a planogram based at least in part on a respective identification code and the respective plurality of attributes.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 schematically depicts a method of characterizing one or more inventory items to a planogram, according to an embodiment.

FIG. 2 schematically depicts a method of characterizing one or more inventory items to a planogram, according to another embodiment.

DETAILED DESCRIPTION

The present invention embraces methods for inputting products into an inventory system.

When an inventory system is initially installed at a business or warehouse (e.g., a retail business), the installer typically must manually enter all of the product information into the inventory system or import the data from an external system. In many real-life situations, the customer (i.e., the business or warehouse at which the inventory system is being installed) does not have the product information or only has incomplete product information.

The present invention embraces a method and system for entering product information into an inventory system (e.g., a retail inventor system). In typical embodiments, the product information is entered via a workflow, which may be voice-directed. The method and system permit a user to describe the location of a product (e.g., by speaking into a microphone or entering text via a keyboard or touchscreen input device), scan a product-identifying symbol (e.g., an indicia, barcode, UPC symbol, 2D barcode, QR code, text on the packaging), input a shelf label (e.g., via scanning, speech input, text input via a keyboard or touchscreen input device), capture an image of the product (e.g., with the device used to capture the location of the product, with the device used to scan the product-identifying symbol, with another device, and/or with a head-mounted display device that includes an image sensor). Each item of information captured by the user can be stored on one of the devices used to capture the information and later transmitted to the inventory system and/or transmitted directly to the inventory system. In exemplary embodiments, the method and system direct a user through a workflow to achieve the input of the product information into the inventory system. The workflow may be visually directed and/or voice-directed, for example, using one or more devices available from Vocollect and/or Honeywell, such as the Dolphin CT50 and the Dolphin 75.

In exemplary embodiments, the workflow, which can be visually directed and/or voice directed, allows a user to direct an employee to describe the location, scan the barcode and shelf label, take a picture with the device, and record the current inventory of each product that needs to be entered into an inventory management system. In situations where the location information of an inventory is not available from an external resource such as, a database, the user can describe the location using verbal commands while moving in the inventory and accordingly the database of the inventory management system would be configured or updated.

FIG. 1 shows a method 100 of characterizing one or more inventory items to a planogram, according to an embodiment. At 102, one or more images are received using an imaging device, the one or more images comprising a view of a scene including one or more inventory items and an indicia for at least one of the one or more inventory items, each indicia comprising an identification code configured to identify a respective one of the one or more inventory items. At 104, one or more utterances are received from a user using a voice recognition system, the one or more utterances comprising a spoken description of at least one of the one or more inventory items. 106 includes identifying at least one of the one or more inventory items in the scene and an identification code corresponding to each of the at least one identified inventory items, wherein the identifying is based at least in part on the one or more images and at least in part on the one or more utterances. At 108, a plurality of attributes corresponding to the at least one of the one or more inventory items is identified, the plurality of attributes identified based at least in part on the one or more images and at least in part on the one or more utterances. And at 110, the one or more inventory items are characterized to a planogram based at least in part on the respective identification code and the respective plurality of attributes.

In an embodiment, the one or more images comprising the view of the scene can include one or more of: a location corresponding to at least one of the one or more inventory items in the scene; a quantity corresponding to at least one of the one or more inventory items in the scene; a facing arrangement corresponding to at least one of the one or more inventory items in the scene; a floor layout corresponding to at least one of the one or more inventory items in the scene; a fixture attribute corresponding to at least one of the one or more inventory items in the scene; and an identification code corresponding to at least one of the one or more inventory items in the scene.

In an embodiment, the one or more utterances can include one or more of: a location corresponding to at least one of the one or more inventory items in the scene; a quantity corresponding to at least one of the one or more inventory items in the scene; a facing arrangement corresponding to at least one of the one or more inventory items in the scene; a floor layout corresponding to at least one of the one or more inventory items in the scene; a fixture attribute corresponding to at least one of the one or more inventory items in the scene; and an identification code corresponding to at least one of the one or more inventory items.

In the method 100, the plurality of attributes can include one or more of: a location corresponding to a respective inventory item; a quantity corresponding to a respective inventory item; a facing arrangement corresponding to a respective inventory item; a floor layout corresponding to a respective inventory item; and a fixture attribute corresponding to a respective inventory item.

In an embodiment, the planogram can include: a visual representation of the scene, the visual representation based at least in part on the one or more images and at least in part on the one or more utterances; a description of the at least one of the one or more inventory items in the scene, the description comprising a visual representation of the inventory item and/or a textual description of the inventory item, wherein the description is based at least in part on the one or more utterances; and a description of the plurality of attributes corresponding to the at least one of the one or more inventory items, the description comprising a visual representation of at least some of the attributes and a textural description of at least some of attributes.

In the method 100, the description of the at least one of the one or more inventory items in the scene can include an identification code corresponding to at least one of the one or more inventory items in the scene. The description of the plurality of attributes corresponding to the at least one of the one or more inventory items can include a description of one or more of: a location corresponding to at least one of the one or more inventory items in the scene, the description of the location comprising a visual representation of the location and/or a textual description of the location; a quantity corresponding to at least one of the one or more inventory items in the scene, the description of the quantity comprising a visual representation of the quantity and/or a textual description of the quantity; a facing arrangement corresponding to at least one of the one or more inventory items in the scene, the description of the facing arrangement comprising a visual representation of the facing arrangement and/or a textual description of the facing arrangement; a floor layout corresponding to at least one of the one or more inventory items in the scene, the description of the layout comprising a visual representation of the layout and/or a textual description of the layout; and a fixture attribute corresponding to at least one of the one or more inventory items in the scene, the description of the fixture attributes comprising a visual representation of the fixture attribute and/or a textual description of the fixture attribute.

In an embodiment, the method 100 can further include identifying a first inventory item based at least in part on the one or more images and at least in part on the one or more utterances. Additionally or alternatively, the method 100 can include identifying a first inventory item based at least in part on the one or more images and identifying a second inventory item based at least in part on the one or more utterances. Additionally or alternatively, the method 100 can include identifying a first inventory item based at least in part on the one or more images and identifying an identification code corresponding to the first inventory item based at least in part on the one or more utterances. Furthermore, the method 100 can include identifying a first inventory item based at least in part on the one or more utterances and identifying an identification code corresponding to the first inventory item based at least in part on the one or more images. The method 100 can also include identifying a first inventory item based at least in part on the one or more images and at least in part on the one or more utterances, and identifying an identification code corresponding to the first inventory item based at least in part on the one or more images and at least in part on the one or more utterances.

In an embodiment, the identification code can include a shelf identification code, and/or an SKU code. The one or more utterances can include a spoken name for an inventory item, a spoken identification code corresponding to an inventory item, and/or a spoken description of one or more of the plurality of attributes. The spoken description of the one or more of the plurality of attributes can include one or more of: a spoken description of a location corresponding to a respective inventory item; a spoken description of a quantity corresponding to a respective inventory item; a spoken description of a facing arrangement corresponding to a respective inventory item; a spoken description of a floor layout corresponding to a respective inventory item; and a spoken description of a fixture attribute corresponding to a respective inventory item.

FIG. 2 shows a method 200 of characterizing one or more inventory items to a planogram, according to an embodiment. At 202, one or more images are received using an imaging device. The one or more images include a view of a scene including one or more inventory items and one or more of: an indicia for at least one of the one or more inventory items, each indicia comprising an identification code configured to identify a respective one of the one or more inventory items; a location corresponding to at least one of the one or more inventory items in the scene; a quantity corresponding to at least one of the one or more inventory items in the scene; a facing arrangement corresponding to at least one of the one or more inventory items in the scene; a floor layout corresponding to at least one of the one or more inventory items in the scene; and a fixture attribute corresponding to at least one of the one or more inventory items in the scene. At 204, one or more utterances from a user are received using a voice recognition system. The one or more utterances include a spoken description of one or more of: at least one of the one or more inventory items; a location corresponding to at least one of the one or more inventory items in the scene; a quantity corresponding to at least one of the one or more inventory items in the scene; a facing arrangement corresponding to at least one of the one or more inventory items in the scene; a floor layout corresponding to at least one of the one or more inventory items in the scene; a fixture attribute corresponding to at least one of the one or more inventory items in the scene; and an identification code corresponding to at least one of the one or more inventory items. At 206, at least one of the one or more inventory items in the scene is identified based at least in part on the one or more images and at least in part on the one or more utterances. At 208, a plurality of attributes corresponding to the at least one of the one or more inventory items is identified. The plurality of attributes identified is based at least in part on the one or more images and at least in part on the one or more utterances. The plurality of attributes includes one or more of: a location corresponding to a respective inventory item; a quantity corresponding to a respective inventory item; a facing arrangement corresponding to a respective inventory item; a floor layout corresponding to a respective inventory item; and a fixture attribute corresponding to a respective inventory item. And at 210, the one or more inventory items are characterized to a planogram based at least in part on the respective identification code and the respective plurality of attributes. The planogram includes: a visual representation of the scene, the visual representation based at least in part on the one or more images and at least in part on the one or more utterances; a description of the at least one of the one or more inventory items in the scene and of the corresponding identification codes, the description comprising a visual representation of the inventory item and/or a textual description of the inventory item, wherein the description is based at least in part on the one or more utterances; and a description of placement of the at least one of the one or more inventory items in the scene. The placement is in respect of one or more of the following attributes respectively corresponding to the at least one of the one or more inventory items: a location corresponding to at least one of the one or more inventory items in the scene, the description of the location comprising a visual representation of the location and/or a textual description of the location; a quantity corresponding to at least one of the one or more inventory items in the scene, the description of the quantity comprising a visual representation of the quantity and/or a textual description of the quantity; a facing arrangement corresponding to at least one of the one or more inventory items in the scene, the description of the facing arrangement comprising a visual representation of the facing arrangement and/or a textual description of the facing arrangement; a floor layout corresponding to at least one of the one or more inventory items in the scene, the description of the layout comprising a visual representation of the layout and/or a textual description of the layout; and a fixture attribute corresponding to at least one of the one or more inventory items in the scene, the description of the fixture attributes comprising a visual representation of the fixture attribute and/or a textual description of the fixture attribute.

In an embodiment, the method 200 can further include identifying an identification code corresponding to at least one of the one or more inventory items based at least in part on the one or more images and at least in part on the one or more utterances. Additionally or alternatively, the method 200 can include initiating the method 200 at least in part by providing a prompt configured to instruct the user to characterize the one or more inventory items. The prompt can include an audible prompt, the audible prompt including an identification of at least one inventory item.

Additionally, the method 200 can include providing a prompt configured to instruct the user to characterize the one or more inventory items upon identifying at least one inventory item in the scene based at least in part on the one or more images. The method 200 can also include capturing the one or more images using the imaging device upon receiving the one or more utterances from the user using the voice recognition system.

In an embodiment, the method 200 can further include receiving coordinates corresponding to one or more of: the location for at least one of the one or more inventory items; the facing arrangement for at least one of the one or more inventory items; and the floor layout for at least one of the one or more inventory items. The coordinates can include geoposition coordinates. The coordinates can be generated using a Wi-Fi positioning system, and/or using the one or more images comprising the view of the scene.

Identifying the one or more inventory items in the scene at 206 can include: identifying the one or more indicia in the one or more images comprising the view of the scene; decoding the one or more indicia to obtain the corresponding one or more identification codes; and searching a database to identify the respective one or more inventory items corresponding to the one or more identification codes.

In an embodiment, identifying the quantity can include identifying a current quantity and/or a stocking quantity based at least in part on the one or more images, and/or based at least in part on the one or more utterances.

The method 200 can include generating the planogram in a two-dimensional graphic corresponding to the view of the scene and/or in a three-dimensional graphic corresponding to the view of the scene. Additionally or alternatively, the method 200 can include transposing the one or more images, providing a view of the scene from a different orientation, and wherein the planogram comprising the visual representation corresponds to the different orientation.

In an embodiment, the planogram can include instructions for positioning the one or more inventory items on the one or more fixture attributes. The method 200 can include storing the planogram in a database. Additionally or alternatively, the method 200 can include storing at least one of the following aspects of information pertaining to the one or more inventory items in one or more nascent database entries: the visual representation of the scene; the description of the at least one of the one or more inventory items in the scene and of the corresponding identification codes; the description of the location corresponding to at least one of the one or more inventory items in the scene; the description of the quantity corresponding to at least one of the one or more inventory items in the scene; the description of the facing arrangement corresponding to at least one of the one or more inventory items in the scene; the description of the floor layout corresponding to at least one of the one or more inventory items in the scene; the description of the fixture attribute corresponding to at least one of the one or more inventory items in the scene; and the description of the placement of the at least one of the one or more inventory items in the scene in respect of the one or more attributes.

In an embodiment, at least one of the following aspects of information pertaining to the one or more inventory items may have been unavailable prior to receiving the one or more images and/or prior to receiving the one or more utterances: the visual representation of the scene; the description of the at least one of the one or more inventory items in the scene and of the corresponding identification codes; the description of the location corresponding to at least one of the one or more inventory items in the scene; the description of the quantity corresponding to at least one of the one or more inventory items in the scene; the description of the facing arrangement corresponding to at least one of the one or more inventory items in the scene; the description of the floor layout corresponding to at least one of the one or more inventory items in the scene; the description of the fixture attribute corresponding to at least one of the one or more inventory items in the scene; and the description of the placement of the at least one of the one or more inventory items in the scene in respect of the one or more attributes.

In an embodiment, the description of the location and/or the description of the quantity corresponding to the at least one of the one or more inventory items in the scene can include coordinates corresponding to one or more of: the location corresponding to the at least one of the one or more inventory items; the facing arrangement corresponding to the at least one of the one or more inventory items; the floor layout corresponding to the at least one of the one or more inventory items; and the fixture attribute corresponding to the at least one of the one or more inventory items. Additionally or alternatively, the description of the location and/or the quantity corresponding to the at least one of the one or more inventory items can include a current quantity and/or a stocking quantity.

In an embodiment, the one or more utterances from the user can be received contemporaneously with the one or more images from the imaging device. Alternatively, the one or more utterances from the user can be received separately in time from the one or more images from the imaging device. The method 200 can include receiving the one or more utterances from a first user operating the voice recognition system, and receiving the one or more images from a second user operating the imaging device.

In an embodiment, the view of the scene can include a retail environment selected from the group consisting of: a softline retailer; a grocery retailer; a food retailer; a convenience retailer; a hardline retailer; and a specialty retailer. Additionally or alternatively, the view of the scene can include a retail environment selected from the group consisting of: a department store; a clothing store; a clothing store; a footwear store; a toiletries store; a cosmetics store; a pharmacy; an office-supply store; a discount outlet; a grocery store; a supermarket; a hypermarket; a convenience store; a big-box store; a restaurant; a fruit stand; a bakery; a coffee shop; a farmer's market; a home-improvement store; a hardware store; a warehouse club; an electronics store; an automobile dealership; an appliance store; a furniture store; a sporting goods store; a lumber yard; a bookstore; an art gallery; a craft store; a music store; a musical instrument store; a boutique; a jewelry store; a gift shop; an arcade; a bazaar; a toy store; a category killer; a chain store; a concept store; a co-operative store; a destination store; a general store; a mall; a kiosk; a pop-up retail store; and a retail market.

The method 200 can include providing stocking instructions based at least in part on the planogram. The planogram may characterize a customized store layout. The customized store layout can be selected based at least in part on localized customer desires and/or localized demand. The planogram may incorporate corporate-level business rules and/or best practices pertaining to product placement.

Additionally, the method 200 can include obtaining sales data corresponding to at least one of the one or more inventory items, the sales data stored in a database; calculating a performance metric corresponding to at least one of the one or more inventory items; and characterizing the at least one of the one or more inventory items to the planogram based at least in part on the performance metric. The planogram can include a modification to one or more of: the location corresponding to the at least one of the one or more inventory items in the scene; the quantity corresponding to the at least one of the one or more inventory items in the scene; the facing arrangement corresponding to the at least one of the one or more inventory items in the scene; the floor layout corresponding to the at least one of the one or more inventory items in the scene; and the fixture attribute corresponding to the at least one of the one or more inventory items. In an embodiment, the metric can include one or more of: sales value; gross margin; profit margin; inventory turn; customer conversion ratio; shelf space; and items per purchase.

In an embodiment, the method 200 can include user capturing the one or more images using the imaging device while working in a retail environment in which the one or more inventory items are sold, the working at least in part comprising a task customarily performed by a worker in the retail environment. The imaging device can include a camera and/or a scanner.

Additionally, the method 200 can include receiving one or more manual inputs from a hand-operated input device, wherein the planogram is based at least in part on the one or more manual inputs. The method 200 can also include providing a workflow to the user while the user is working in a retail environment in which the one or more inventory items are sold. The workflow can be configured to direct the user to: capture the one or more images using the imaging device while working in the retail environment; and/or provide the one or more utterances using the voice recognition system; wherein the working at least in part comprising a task customarily performed by a worker in the retail environment. The workflow can include a voice directed workflow, the voice directed workflow provided by an audio headset. Additionally or alternatively, the workflow can include a visually directed workflow, the visually directed workflow provided on a screen of a mobile device.

In an embodiment, the location corresponding to the at least one of the one or more inventory items in the scene may be unavailable from any database resource prior to receiving the one or more images and/or prior to receiving the one or more utterances. The workflow may be prepared in advance based at least in part on known attributes of the retail environment. Additionally or alternatively, the workflow may be generated in real-time while the user is working in a retail environment in which the one or more inventory items are sold. The method 200 can include using the one or more images and/or the one or more utterances to generate a workflow in real-time while the user is working in a retail environment in which the one or more inventory items are sold.

Device and method components are meant to show only those specific details that are pertinent to understanding the embodiments of the present disclosure so as not to obscure the disclosure with details that will be readily apparent to those of ordinary skill in the art having the benefit of the description herein. In various embodiments, the sequence in which the elements of appear in exemplary embodiments disclosed herein may vary. Two or more method steps may be performed simultaneously or in a different order than the sequence in which the elements appear in the exemplary embodiments.

To supplement the present disclosure, this application incorporates entirely by reference the following commonly assigned patents, patent application publications, and patent applications:

U.S. Pat. No. 6,832,725; U.S. Pat. No. 7,128,266; U.S. Pat. No. 7,159,783; U.S. Pat. No. 7,413,1279; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963; U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426; U.S. Pat. No. 8,881,983; U.S. Pat. No. 8,881,987; U.S. Pat. No. 8,903,172; U.S. Pat. No. 8,908,995; U.S. Pat. No. 8,910,870; U.S. Pat. No. 8,910,875; U.S. Pat. No. 8,914,290; U.S. Pat. No. 8,914,788; U.S. Pat. No. 8,915,439; U.S. Pat. No. 8,915,444; U.S. Pat. No. 8,916,789; U.S. Pat. No. 8,918,250; U.S. Pat. No. 8,918,564; U.S. Pat. No. 8,925,818; U.S. Pat. No. 8,939,374; U.S. Pat. No. 8,942,480; U.S. Pat. No. 8,944,313; U.S. Pat. No. 8,944,327; U.S. Pat. No. 8,944,332; U.S. Pat. No. 8,950,678; U.S. Pat. No. 8,967,468; U.S. Pat. No. 8,971,346; U.S. Pat. No. 8,976,030; U.S. Pat. No. 8,976,368; U.S. Pat. No. 8,978,981; U.S. Pat. No. 8,978,983; U.S. Pat. No. 8,978,984; U.S. Pat. No. 8,985,456; U.S. Pat. No. 8,985,457; U.S. Pat. No. 8,985,459; U.S. Pat. No. 8,985,461; U.S. Pat. No. 8,988,578; U.S. Pat. No. 8,988,590; U.S. Pat. No. 8,991,704; U.S. Pat. No. 8,996,194; U.S. Pat. No. 8,996,384; U.S. Pat. No. 9,002,641; U.S. Pat. No. 9,007,368; U.S. Pat. No. 9,010,641; U.S. Pat. No. 9,015,513; U.S. Pat. No. 9,016,576; U.S. Pat. No. 9,022,288; U.S. Pat. No. 9,030,964; U.S. Pat. No. 9,033,240; U.S. Pat. No. 9,033,242; U.S. Pat. No. 9,036,054; U.S. Pat. No. 9,037,344; U.S. Pat. No. 9,038,911; U.S. Pat. No. 9,038,915; U.S. Pat. No. 9,047,098; U.S. Pat. No. 9,047,359; U.S. Pat. No. 9,047,420; U.S. Pat. No. 9,047,525; U.S. Pat. No. 9,047,531; U.S. Pat. No. 9,053,055; U.S. Pat. No. 9,053,378; U.S. Pat. No. 9,053,380; U.S. Pat. No. 9,058,526; U.S. Pat. No. 9,064,165; U.S. Pat. No. 9,064,165; U.S. Pat. No. 9,064,167; U.S. Pat. No. 9,064,168; U.S. Pat. No. 9,064,254; U.S. Pat. No. 9,066,032; U.S. Pat. No. 9,070,032; U.S. Pat. No. 9,076,459; U.S. Pat. No. 9,079,423; U.S. Pat. No. 9,080,856; U.S. Pat. No. 9,082,023; U.S. Pat. No. 9,082,031; U.S. Pat. No. 9,084,032; U.S. Pat. No. 9,087,250; U.S. Pat. No. 9,092,681; U.S. Pat. No. 9,092,682; U.S. Pat. No. 9,092,683; U.S. Pat. No. 9,093,141; U.S. Pat. No. 9,098,763; U.S. Pat. No. 9,104,929; U.S. Pat. No. 9,104,934; U.S. Pat. No. 9,107,484; U.S. Pat. No. 9,111,159; U.S. Pat. No. 9,111,166; U.S. Pat. No. 9,135,483; U.S. Pat. No. 9,137,009; U.S. Pat. No. 9,141,839; U.S. Pat. No. 9,147,096; U.S. Pat. No. 9,148,474; U.S. Pat. No. 9,158,000; U.S. Pat. No. 9,158,340; U.S. Pat. No. 9,158,953; U.S. Pat. No. 9,159,059; U.S. Pat. No. 9,165,174; U.S. Pat. No. 9,171,

543; U.S. Pat. No. 9,183,425; U.S. Pat. No. 9,189,669; U.S. Pat. No. 9,195,844; U.S. Pat. No. 9,202,458; U.S. Pat. No. 9,208,366; U.S. Pat. No. 9,208,367; U.S. Pat. No. 9,219,836; U.S. Pat. No. 9,224,024; U.S. Pat. No. 9,224,027; U.S. Pat. No. 9,230,140; U.S. Pat. No. 9,235,553; U.S. Pat. No. 9,239,950; U.S. Pat. No. 9,245,492; U.S. Pat. No. 9,248,640; U.S. Pat. No. 9,250,652; U.S. Pat. No. 9,250,712; U.S. Pat. No. 9,251,411; U.S. Pat. No. 9,258,033; U.S. Pat. No. 9,262,633; U.S. Pat. No. 9,262,660; U.S. Pat. No. 9,262,662; U.S. Pat. No. 9,269,036; U.S. Pat. No. 9,270,782; U.S. Pat. No. 9,274,812; U.S. Pat. No. 9,275,388; U.S. Pat. No. 9,277,668; U.S. Pat. No. 9,280,693; U.S. Pat. No. 9,286,496; U.S. Pat. No. 9,298,964; U.S. Pat. No. 9,301,427; U.S. Pat. No. 9,313,377; U.S. Pat. No. 9,317,037; U.S. Pat. No. 9,319,548; U.S. Pat. No. 9,342,723; U.S. Pat. No. 9,361,882; U.S. Pat. No. 9,365,381; U.S. Pat. No. 9,373,018; U.S. Pat. No. 9,375,945; U.S. Pat. No. 9,378,403; U.S. Pat. No. 9,383,848; U.S. Pat. No. 9,384,374; U.S. Pat. No. 9,390,304; U.S. Pat. No. 9,390,596; U.S. Pat. No. 9,411,386; U.S. Pat. No. 9,412,242; U.S. Pat. No. 9,418,269; U.S. Pat. No. 9,418,270; U.S. Pat. No. 9,465,967; U.S. Pat. No. 9,423,318; U.S. Pat. No. 9,424,454; U.S. Pat. No. 9,436,860; U.S. Pat. No. 9,443,123; U.S. Pat. No. 9,443,222; U.S. Pat. No. 9,454,689; U.S. Pat. No. 9,464,885; U.S. Pat. No. 9,465,967; U.S. Pat. No. 9,478,983; U.S. Pat. No. 9,481,186; U.S. Pat. No. 9,487,113; U.S. Pat. No. 9,488,986; U.S. Pat. No. 9,489,782; U.S. Pat. No. 9,490,540; U.S. Pat. No. 9,491,729; U.S. Pat. No. 9,497,092; U.S. Pat. No. 9,507,974; U.S. Pat. No. 9,519,814; U.S. Pat. No. 9,521,331; U.S. Pat. No. 9,530,038; U.S. Pat. No. 9,572,901; U.S. Pat. No. 9,558,386; U.S. Pat. No. 9,606,581; U.S. Pat. No. 9,646,189; U.S. Pat. No. 9,646,191; U.S. Pat. No. 9,652,648; U.S. Pat. No. 9,652,653; U.S. Pat. No. 9,656,487; U.S. Pat. No. 9,659,198; U.S. Pat. No. 9,680,282; U.S. Pat. No. 9,697,401; U.S. Pat. No. 9,701,140; U.S. Design Pat. No. D702,237; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D734,339; U.S. Design Pat. No. D737,321; U.S. Design Pat. No. D754,205; U.S. Design Pat. No. D754,206; U.S. Design Pat. No. D757,009; U.S. Design Pat. No. D760,719; U.S. Design Pat. No. D762,604; U.S. Design Pat. No. D766,244; U.S. Design Pat. No. D777,166; U.S. Design Pat. No. D771,631; U.S. Design Pat. No. D783,601; U.S. Design Pat. No. D785,617; U.S. Design Pat. No. D785,636; U.S. Design Pat. No. D790,505; U.S. Design Pat. No. D790,546; International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0125853; U.S. Patent Application Publication No. 2014/0125999; U.S. Patent Application Publication No. 2014/0129378; U.S. Patent Application Publication No. 2014/0131443; U.S. Patent Application Publication No. 2014/0133379; U.S. Patent Application Publication No. 2014/0136208; U.S. Patent Application Publication No. 2014/0140585; U.S. Patent Application Publication No. 2014/0152882; U.S. Patent Application Publication No. 2014/0158770; U.S. Patent Application Publication No. 2014/0159869; U.S. Patent Application Publication No. 2014/0166759; U.S. Patent Application Publication No. 2014/0168787; U.S. Patent Application Publication No. 2014/0175165; U.S. Patent Application Publication No. 2014/0191684; U.S. Patent Application Publication No. 2014/0191913; U.S. Patent Application Publication No. 2014/0197304; U.S. Patent Application Publication No. 2014/0214631; U.S. Patent Application Publication No. 2014/0217166; U.S. Patent Application Publication No. 2014/0231500; U.S. Patent Application Publication No. 2014/0247315; U.S. Patent Application Publication No. 2014/0263493; U.S. Patent Application Publication No. 2014/0263645; U.S. Patent Application Publication No. 2014/0270196; U.S. Patent Application Publication No. 2014/0270229; U.S. Patent Application Publication No. 2014/0278387; U.S.

Patent Application Publication No. 2014/0288933; U.S.
Patent Application Publication No. 2014/0297058; U.S.
Patent Application Publication No. 2014/0299665; U.S.
Patent Application Publication No. 2014/0332590; U.S.
Patent Application Publication No. 2014/0351317; U.S.
Patent Application Publication No. 2014/0362184; U.S.
Patent Application Publication No. 2014/0363015; U.S.
Patent Application Publication No. 2014/0369511; U.S.
Patent Application Publication No. 2014/0374483; U.S.
Patent Application Publication No. 2014/0374485; U.S.
Patent Application Publication No. 2015/0001301; U.S.
Patent Application Publication No. 2015/0001304; U.S.
Patent Application Publication No. 2015/0009338; U.S.
Patent Application Publication No. 2015/0014416; U.S.
Patent Application Publication No. 2015/0021397; U.S.
Patent Application Publication No. 2015/0028104; U.S.
Patent Application Publication No. 2015/0029002; U.S.
Patent Application Publication No. 2015/0032709; U.S.
Patent Application Publication No. 2015/0039309; U.S.
Patent Application Publication No. 2015/0039878; U.S.
Patent Application Publication No. 2015/0040378; U.S.
Patent Application Publication No. 2015/0049347; U.S.
Patent Application Publication No. 2015/0051992; U.S.
Patent Application Publication No. 2015/0053769; U.S.
Patent Application Publication No. 2015/0062366; U.S.
Patent Application Publication No. 2015/0063215; U.S.
Patent Application Publication No. 2015/0088522; U.S.
Patent Application Publication No. 2015/0096872; U.S.
Patent Application Publication No. 2015/0100196; U.S.
Patent Application Publication No. 2015/0102109; U.S.
Patent Application Publication No. 2015/0115035; U.S.
Patent Application Publication No. 2015/0127791; U.S.
Patent Application Publication No. 2015/0128116; U.S.
Patent Application Publication No. 2015/0133047; U.S.
Patent Application Publication No. 2015/0134470; U.S.
Patent Application Publication No. 2015/0136851; U.S.
Patent Application Publication No. 2015/0142492; U.S.
Patent Application Publication No. 2015/0144692; U.S.
Patent Application Publication No. 2015/0144698; U.S.
Patent Application Publication No. 2015/0149946; U.S.
Patent Application Publication No. 2015/0161429; U.S.
Patent Application Publication No. 2015/0178523; U.S.
Patent Application Publication No. 2015/0178537; U.S.
Patent Application Publication No. 2015/0178685; U.S.
Patent Application Publication No. 2015/0181109; U.S.
Patent Application Publication No. 2015/0199957; U.S.
Patent Application Publication No. 2015/0210199; U.S.
Patent Application Publication No. 2015/0212565; U.S.
Patent Application Publication No. 2015/0213647; U.S.
Patent Application Publication No. 2015/0220753; U.S.
Patent Application Publication No. 2015/0220901; U.S.
Patent Application Publication No. 2015/0227189; U.S.
Patent Application Publication No. 2015/0236984; U.S.
Patent Application Publication No. 2015/0239348; U.S.
Patent Application Publication No. 2015/0242658; U.S.
Patent Application Publication No. 2015/0248572; U.S.
Patent Application Publication No. 2015/0254485; U.S.
Patent Application Publication No. 2015/0261643; U.S.
Patent Application Publication No. 2015/0264624; U.S.
Patent Application Publication No. 2015/0268971; U.S.
Patent Application Publication No. 2015/0269402; U.S.
Patent Application Publication No. 2015/0288689; U.S.
Patent Application Publication No. 2015/0288896; U.S.
Patent Application Publication No. 2015/0310243; U.S.
Patent Application Publication No. 2015/0310244; U.S.
Patent Application Publication No. 2015/0310389; U.S.
Patent Application Publication No. 2015/0312780; U.S.
Patent Application Publication No. 2015/0327012; U.S.
Patent Application Publication No. 2016/0014251; U.S.
Patent Application Publication No. 2016/0025697; U.S.
Patent Application Publication No. 2016/0026838; U.S.
Patent Application Publication No. 2016/0026839; U.S.
Patent Application Publication No. 2016/0040982; U.S.
Patent Application Publication No. 2016/0042241; U.S.
Patent Application Publication No. 2016/0057230; U.S.
Patent Application Publication No. 2016/0062473; U.S.
Patent Application Publication No. 2016/0070944; U.S.
Patent Application Publication No. 2016/0092805; U.S.
Patent Application Publication No. 2016/0101936; U.S.
Patent Application Publication No. 2016/0104019; U.S.
Patent Application Publication No. 2016/0104274; U.S.
Patent Application Publication No. 2016/0109219; U.S.
Patent Application Publication No. 2016/0109220; U.S.
Patent Application Publication No. 2016/0109224; U.S.
Patent Application Publication No. 2016/0112631; U.S.
Patent Application Publication No. 2016/0112643; U.S.
Patent Application Publication No. 2016/0117627; U.S.
Patent Application Publication No. 2016/0124516; U.S.
Patent Application Publication No. 2016/0125217; U.S.
Patent Application Publication No. 2016/0125342; U.S.
Patent Application Publication No. 2016/0125873; U.S.
Patent Application Publication No. 2016/0133253; U.S.
Patent Application Publication No. 2016/0171597; U.S.
Patent Application Publication No. 2016/0171666; U.S.
Patent Application Publication No. 2016/0171720; U.S.
Patent Application Publication No. 2016/0171775; U.S.
Patent Application Publication No. 2016/0171777; U.S.
Patent Application Publication No. 2016/0174674; U.S.
Patent Application Publication No. 2016/0178479; U.S.
Patent Application Publication No. 2016/0178685; U.S.
Patent Application Publication No. 2016/0178707; U.S.
Patent Application Publication No. 2016/0179132; U.S.
Patent Application Publication No. 2016/0179143; U.S.
Patent Application Publication No. 2016/0179368; U.S.
Patent Application Publication No. 2016/0179378; U.S.
Patent Application Publication No. 2016/0180130; U.S.
Patent Application Publication No. 2016/0180133; U.S.
Patent Application Publication No. 2016/0180136; U.S.
Patent Application Publication No. 2016/0180594; U.S.
Patent Application Publication No. 2016/0180663; U.S.
Patent Application Publication No. 2016/0180678; U.S.
Patent Application Publication No. 2016/0180713; U.S.
Patent Application Publication No. 2016/0185136; U.S.
Patent Application Publication No. 2016/0185291; U.S.
Patent Application Publication No. 2016/0186926; U.S.
Patent Application Publication No. 2016/0188861; U.S.
Patent Application Publication No. 2016/0188939; U.S.
Patent Application Publication No. 2016/0188940; U.S.
Patent Application Publication No. 2016/0188941; U.S.
Patent Application Publication No. 2016/0188942; U.S.
Patent Application Publication No. 2016/0188943; U.S.
Patent Application Publication No. 2016/0188944; U.S.
Patent Application Publication No. 2016/0189076; U.S.
Patent Application Publication No. 2016/0189087; U.S.
Patent Application Publication No. 2016/0189088; U.S.
Patent Application Publication No. 2016/0189092; U.S.
Patent Application Publication No. 2016/0189284; U.S.
Patent Application Publication No. 2016/0189288; U.S.
Patent Application Publication No. 2016/0189366; U.S.
Patent Application Publication No. 2016/0189443; U.S.
Patent Application Publication No. 2016/0189447; U.S.
Patent Application Publication No. 2016/0189489; U.S.
Patent Application Publication No. 2016/0192051; U.S.
Patent Application Publication No. 2016/0202951; U.S.

Patent Application Publication No. 2016/0202958; U.S.
Patent Application Publication No. 2016/0202959; U.S.
Patent Application Publication No. 2016/0203021; U.S.
Patent Application Publication No. 2016/0203429; U.S.
Patent Application Publication No. 2016/0203797; U.S.
Patent Application Publication No. 2016/0203820; U.S.
Patent Application Publication No. 2016/0204623; U.S.
Patent Application Publication No. 2016/0204636; U.S.
Patent Application Publication No. 2016/0204638; U.S.
Patent Application Publication No. 2016/0227912; U.S.
Patent Application Publication No. 2016/0232891; U.S.
Patent Application Publication No. 2016/0292477; U.S.
Patent Application Publication No. 2016/0294779; U.S.
Patent Application Publication No. 2016/0306769; U.S.
Patent Application Publication No. 2016/0314276; U.S.
Patent Application Publication No. 2016/0314294; U.S.
Patent Application Publication No. 2016/0316190; U.S.
Patent Application Publication No. 2016/0323310; U.S.
Patent Application Publication No. 2016/0325677; U.S.
Patent Application Publication No. 2016/0327614; U.S.
Patent Application Publication No. 2016/0327930; U.S.
Patent Application Publication No. 2016/0328762; U.S.
Patent Application Publication No. 2016/0330218; U.S.
Patent Application Publication No. 2016/0343163; U.S.
Patent Application Publication No. 2016/0343176; U.S.
Patent Application Publication No. 2016/0364914; U.S.
Patent Application Publication No. 2016/0370220; U.S.
Patent Application Publication No. 2016/0372282; U.S.
Patent Application Publication No. 2016/0373847; U.S.
Patent Application Publication No. 2016/0377414; U.S.
Patent Application Publication No. 2016/0377417; U.S.
Patent Application Publication No. 2017/0010141; U.S.
Patent Application Publication No. 2017/0010328; U.S.
Patent Application Publication No. 2017/0010780; U.S.
Patent Application Publication No. 2017/0016714; U.S.
Patent Application Publication No. 2017/0018094; U.S.
Patent Application Publication No. 2017/0046603; U.S.
Patent Application Publication No. 2017/0047864; U.S.
Patent Application Publication No. 2017/0053146; U.S.
Patent Application Publication No. 2017/0053147; U.S.
Patent Application Publication No. 2017/0053647; U.S.
Patent Application Publication No. 2017/0055606; U.S.
Patent Application Publication No. 2017/0060316; U.S.
Patent Application Publication No. 2017/0061961; U.S.
Patent Application Publication No. 2017/0064634; U.S.
Patent Application Publication No. 2017/0083730; U.S.
Patent Application Publication No. 2017/0091502; U.S.
Patent Application Publication No. 2017/0091706; U.S.
Patent Application Publication No. 2017/0091741; U.S.
Patent Application Publication No. 2017/0091904; U.S.
Patent Application Publication No. 2017/0092908; U.S.
Patent Application Publication No. 2017/0094238; U.S.
Patent Application Publication No. 2017/0098947; U.S.
Patent Application Publication No. 2017/0100949; U.S.
Patent Application Publication No. 2017/0108838; U.S.
Patent Application Publication No. 2017/0108895; U.S.
Patent Application Publication No. 2017/0118355; U.S.
Patent Application Publication No. 2017/0123598; U.S.
Patent Application Publication No. 2017/0124369; U.S.
Patent Application Publication No. 2017/0124396; U.S.
Patent Application Publication No. 2017/0124687; U.S.
Patent Application Publication No. 2017/0126873; U.S.
Patent Application Publication No. 2017/0126904; U.S.
Patent Application Publication No. 2017/0139012; U.S.
Patent Application Publication No. 2017/0140329; U.S.
Patent Application Publication No. 2017/0140731; U.S.
Patent Application Publication No. 2017/0147847; U.S.
Patent Application Publication No. 2017/0150124; U.S.
Patent Application Publication No. 2017/0169198; U.S.
Patent Application Publication No. 2017/0171035; U.S.
Patent Application Publication No. 2017/0171703; U.S.
Patent Application Publication No. 2017/0171803; U.S.
Patent Application Publication No. 2017/0180359; U.S.
Patent Application Publication No. 2017/0180577; U.S.
Patent Application Publication No. 2017/0181299; U.S.
Patent Application Publication No. 2017/0190192; U.S.
Patent Application Publication No. 2017/0193432; U.S.
Patent Application Publication No. 2017/0193461; U.S.
Patent Application Publication No. 2017/0193727; U.S.
Patent Application Publication No. 2017/0199266; U.S.
Patent Application Publication No. 2017/0200108; and
U.S. Patent Application Publication No. 2017/0200275.

The following represent Exemplary Embodiments:

A1. A method of characterizing one or more inventory items to a planogram, the method comprising:

receiving one or more images using an imaging device, the one or more images comprising a view of a scene including one or more inventory items and an indicia for at least one of the one or more inventory items, each indicia comprising an identification code configured to identify a respective one of the one or more inventory items;

receiving one or more utterances from a user using a voice recognition system, the one or more utterances comprising a spoken description of at least one of the one or more inventory items;

identifying at least one of the one or more inventory items in the scene and an identification code corresponding to each of the at least one identified inventory items, wherein the identifying is based at least in part on the one or more images and at least in part on the one or more utterances;

identifying a plurality of attributes corresponding to the at least one of the one or more inventory items, the plurality of attributes identified based at least in part on the one or more images and at least in part on the one or more utterances; and characterizing the one or more inventory items to a planogram based at least in part on the respective identification code and the respective plurality of attributes.

A2. The method of A1, wherein the one or more images comprising the view of the scene comprises one or more of:

a location corresponding to at least one of the one or more inventory items in the scene;

a quantity corresponding to at least one of the one or more inventory items in the scene;

a facing arrangement corresponding to at least one of the one or more inventory items in the scene;

a floor layout corresponding to at least one of the one or more inventory items in the scene;

a fixture attribute corresponding to at least one of the one or more inventory items in the scene; and an identification code corresponding to at least one of the one or more inventory items in the scene.

A3. The method of A1, wherein the one or more utterances comprises one or more of:

a location corresponding to at least one of the one or more inventory items in the scene;

a quantity corresponding to at least one of the one or more inventory items in the scene;

a facing arrangement corresponding to at least one of the one or more inventory items in the scene;

a floor layout corresponding to at least one of the one or more inventory items in the scene;

a fixture attribute corresponding to at least one of the one or more inventory items in the scene; and an identification code corresponding to at least one of the one or more inventory items.

A4. The method of A1, wherein the plurality of attributes comprises one or more of:
- a location corresponding to a respective inventory item;
- a quantity corresponding to a respective inventory item;
- a facing arrangement corresponding to a respective inventory item;
- a floor layout corresponding to a respective inventory item; and
- a fixture attribute corresponding to a respective inventory item.

A5. The method of A1, wherein the planogram comprises:
- a visual representation of the scene, the visual representation based at least in part on the one or more images and at least in part on the one or more utterances;
- a description of the at least one of the one or more inventory items in the scene, the description comprising a visual representation of the inventory item and/or a textual description of the inventory item, wherein the description is based at least in part on the one or more utterances; and
- a description of the plurality of attributes corresponding to the at least one of the one or more inventory items, the description comprising a visual representation of at least some of the attributes and a textural description of at least some of attributes.

A6. The method of A1, wherein the description of the at least one of the one or more inventory items in the scene comprises an identification code corresponding to at least one of the one or more inventory items in the scene.

A7. The method of A1, wherein the description of the plurality of attributes corresponding to the at least one of the one or more inventory items comprises a description of one or more of:
- a location corresponding to at least one of the one or more inventory items in the scene, the description of the location comprising a visual representation of the location and/or a textual description of the location;
- a quantity corresponding to at least one of the one or more inventory items in the scene, the description of the quantity comprising a visual representation of the quantity and/or a textual description of the quantity;
- a facing arrangement corresponding to at least one of the one or more inventory items in the scene, the description of the facing arrangement comprising a visual representation of the facing arrangement and/or a textual description of the facing arrangement;
- a floor layout corresponding to at least one of the one or more inventory items in the scene, the description of the layout comprising a visual representation of the layout and/or a textual description of the layout; and
- a fixture attribute corresponding to at least one of the one or more inventory items in the scene, the description of the fixture attributes comprising a visual representation of the fixture attribute and/or a textual description of the fixture attribute.

A8. The method of A1, comprising identifying a first inventory item based at least in part on the one or more images and at least in part on the one or more utterances.

A9. The method of A1, comprising identifying a first inventory item based at least in part on the one or more images and identifying a second inventory item based at least in part on the one or more utterances.

A10. The method of A1, comprising identifying a first inventory item based at least in part on the one or more images and identifying an identification code corresponding to the first inventory item based at least in part on the one or more utterances.

A11. The method of A1, comprising identifying a first inventory item based at least in part on the one or more utterances and identifying an identification code corresponding to the first inventory item based at least in part on the one or more images.

A12. The method of A1, comprising identifying a first inventory item based at least in part on the one or more images and at least in part on the one or more utterances, and identifying an identification code corresponding to the first inventory item based at least in part on the one or more images and at least in part on the one or more utterances.

A13. The method of A1, wherein the identification code comprises a shelf identification code.

A14. The method of A1, wherein the identification code comprises an SKU code.

A15. The method of A1, wherein the one or more utterances comprise a spoken name for an inventory item.

A16. The method of A1, wherein the one or more utterances comprise a spoken identification code corresponding to an inventory item.

A17. The method of A1, wherein the one or more utterances comprise a spoken description of one or more of the plurality of attributes.

A18. The method of A17, wherein the spoken description of the one or more of the plurality of attributes comprises one or more of:
- a spoken description of a location corresponding to a respective inventory item;
- a spoken description of a quantity corresponding to a respective inventory item;
- a spoken description of a facing arrangement corresponding to a respective inventory item;
- a spoken description of a floor layout corresponding to a respective inventory item; and
- a spoken description of a fixture attribute corresponding to a respective inventory item.

B19. A method of characterizing one or more inventory items to a planogram, the method comprising:
receiving one or more images using an imaging device, the one or more images comprising a view of a scene including one or more inventory items and one or more of:
- an indicia for at least one of the one or more inventory items, each indicia comprising an identification code configured to identify a respective one of the one or more inventory items;
- a location corresponding to at least one of the one or more inventory items in the scene;
- a quantity corresponding to at least one of the one or more inventory items in the scene;
- a facing arrangement corresponding to at least one of the one or more inventory items in the scene;
- a floor layout corresponding to at least one of the one or more inventory items in the scene; and
- a fixture attribute corresponding to at least one of the one or more inventory items in the scene;

receiving one or more utterances from a user using a voice recognition system, the one or more utterances comprising a spoken description of one or more of:
- at least one of the one or more inventory items;
- a location corresponding to at least one of the one or more inventory items in the scene;
- a quantity corresponding to at least one of the one or more inventory items in the scene;

a facing arrangement corresponding to at least one of the one or more inventory items in the scene;
a floor layout corresponding to at least one of the one or more inventory items in the scene;
a fixture attribute corresponding to at least one of the one or more inventory items in the scene; and
an identification code corresponding to at least one of the one or more inventory items;
identifying at least one of the one or more inventory items in the scene based at least in part on the one or more images and at least in part on the one or more utterances;
identifying a plurality of attributes corresponding to the at least one of the one or more inventory items, the plurality of attributes identified based at least in part on the one or more images and at least in part on the one or more utterances, wherein the plurality of attributes comprises one or more of:
 a location corresponding to a respective inventory item;
 a quantity corresponding to a respective inventory item;
 a facing arrangement corresponding to a respective inventory item;
 a floor layout corresponding to a respective inventory item; and
 a fixture attribute corresponding to a respective inventory item; and
characterizing the one or more inventory items to a planogram based at least in part on the respective identification code and the respective plurality of attributes, the planogram comprising:
 a visual representation of the scene, the visual representation based at least in part on the one or more images and at least in part on the one or more utterances;
 a description of the at least one of the one or more inventory items in the scene and of the corresponding identification codes, the description comprising a visual representation of the inventory item and/or a textual description of the inventory item, wherein the description is based at least in part on the one or more utterances; and
 a description of placement of the at least one of the one or more inventory items in the scene, the placement being in respect of one or more of the following attributes respectively corresponding to the at least one of the one or more inventory items:
  a location corresponding to at least one of the one or more inventory items in the scene, the description of the location comprising a visual representation of the location and/or a textual description of the location;
  a quantity corresponding to at least one of the one or more inventory items in the scene, the description of the quantity comprising a visual representation of the quantity and/or a textual description of the quantity;
  a facing arrangement corresponding to at least one of the one or more inventory items in the scene, the description of the facing arrangement comprising a visual representation of the facing arrangement and/or a textual description of the facing arrangement;
  a floor layout corresponding to at least one of the one or more inventory items in the scene, the description of the layout comprising a visual representation of the layout and/or a textual description of the layout; and
  a fixture attribute corresponding to at least one of the one or more inventory items in the scene, the description of the fixture attributes comprising a visual representation of the fixture attribute and/or a textual description of the fixture attribute.

B20. The method of B19, further comprising identifying an identification code corresponding to at least one of the one or more inventory items based at least in part on the one or more images and at least in part on the one or more utterances.

B21. The method of B19, further comprising initiating the method at least in part by providing a prompt configured to instruct the user to characterize the one or more inventory items.

B22. The method of B21, wherein the prompt comprises an audible prompt, the audible prompt comprising an identification of at least one inventory item.

B23. The method of B19, further comprising providing a prompt configured to instruct the user to characterize the one or more inventory items upon identifying at least one inventory item in the scene based at least in part on the one or more images.

B24. The method of B19, further comprising capturing the one or more images using the imaging device upon receiving the one or more utterances from the user using the voice recognition system.

B25. The method of B19, further comprising receiving coordinates corresponding to one or more of:
 the location for at least one of the one or more inventory items;
 the facing arrangement for at least one of the one or more inventory items; and
 the floor layout for at least one of the one or more inventory items.

B26. The method of B25, wherein the coordinates comprise geoposition coordinates.

B27. The method of B25, wherein the coordinates are generated using a Wi-Fi positioning system.

B28. The method of B25, wherein the coordinates are generated using the one or more images comprising the view of the scene.

B29. The method of B19, wherein identifying the one or more inventory items in the scene comprises:
 identifying the one or more indicia in the one or more images comprising the view of the scene;
 decoding the one or more indicia to obtain the corresponding one or more identification codes; and
 searching a database to identify the respective one or more inventory items corresponding to the one or more identification codes.

B30. The method of B19, wherein identifying the quantity comprises identifying a current quantity and/or a stocking quantity based at least in part on the one or more images.

B31. The method of B19, wherein identifying the quantity comprises identifying a current quantity and/or a stocking quantity based at least in part on the one or more utterances.

B32. The method of B19, further comprising generating the planogram in a two-dimensional graphic corresponding to the view of the scene and/or in a three-dimensional graphic corresponding to the view of the scene.

B33. The method of B19, further comprising transposing the one or more images, providing a view of the scene from a different orientation, and wherein the planogram comprising the visual representation corresponds to the different orientation.

B34. The method of B19, wherein the planogram comprises instructions for positioning the one or more inventory items on the one or more fixture attributes.

B35. The method of B19, further comprising storing the planogram in a database.

B36. The method of B19, further comprising storing at least one of the following aspects of information pertaining to the one or more inventory items in one or more nascent database entries:
the visual representation of the scene;
the description of the at least one of the one or more inventory items in the scene and of the corresponding identification codes;
the description of the location corresponding to at least one of the one or more inventory items in the scene;
the description of the quantity corresponding to at least one of the one or more inventory items in the scene;
the description of the facing arrangement corresponding to at least one of the one or more inventory items in the scene;
the description of the floor layout corresponding to at least one of the one or more inventory items in the scene;
the description of the fixture attribute corresponding to at least one of the one or more inventory items in the scene; and
the description of the placement of the at least one of the one or more inventory items in the scene in respect of the one or more attributes.

B37. The method of B19, wherein at least one of the following aspects of information pertaining to the one or more inventory items were unavailable prior to receiving the one or more images and/or prior to receiving the one or more utterances:
the visual representation of the scene;
the description of the at least one of the one or more inventory items in the scene and of the corresponding identification codes;
the description of the location corresponding to at least one of the one or more inventory items in the scene;
the description of the quantity corresponding to at least one of the one or more inventory items in the scene;
the description of the facing arrangement corresponding to at least one of the one or more inventory items in the scene;
the description of the floor layout corresponding to at least one of the one or more inventory items in the scene;
the description of the fixture attribute corresponding to at least one of the one or more inventory items in the scene; and
the description of the placement of the at least one of the one or more inventory items in the scene in respect of the one or more attributes.

B38. The method of B19, wherein the description of the location and/or the description of the quantity corresponding to the at least one of the one or more inventory items in the scene comprises coordinates corresponding to one or more of:
the location corresponding to the at least one of the one or more inventory items;
the facing arrangement corresponding to the at least one of the one or more inventory items;
the floor layout corresponding to the at least one of the one or more inventory items; and
the fixture attribute corresponding to the at least one of the one or more inventory items.

B39. The method of B19, wherein the description of the location and/or the quantity corresponding to the at least one of the one or more inventory items comprises a current quantity and/or a stocking quantity.

B40. The method of B19, wherein the one or more utterances from the user are received contemporaneously with the one or more images from the imaging device.

B41. The method of B19, wherein the one or more utterances from the user are received separately in time from the one or more images from the imaging device.

B42. The method of B19, comprising receiving the one or more utterances from a first user operating the voice recognition system, and receiving the one or more images from a second user operating the imaging device.

B43. The method of B19, wherein the view of the scene comprises a retail environment selected from the group consisting of: a softline retailer; a grocery retailer; a food retailer; a convenience retailer; a hardline retailer; and a specialty retailer.

B44. The method of B19, wherein the view of the scene comprises a retail environment selected from the group consisting of: a department store; a clothing store; a clothing store; a footwear store; a toiletries store; a cosmetics store; a pharmacy; an office-supply store; a discount outlet; a grocery store; a supermarket; a hypermarket; a convenience store; a big-box store; a restaurant; a fruit stand; a bakery; a coffee shop; a farmer's market; a home-improvement store; a hardware store; a warehouse club; an electronics store; an automobile dealership; an appliance store; a furniture store; a sporting goods store; a lumber yard; a bookstore; an art gallery; a craft store; a music store; a musical instrument store; a boutique; a jewelry store; a gift shop; an arcade; a bazaar; a toy store; a category killer; a chain store; a concept store; a co-operative store; a destination store; a general store; a mall; a kiosk; a pop-up retail store; and a retail market.

B45. The method of B19, further comprising providing stocking instructions based at least in part on the planogram.

B46. The method of B19, wherein the planogram characterizes a customized store layout.

B47. The method of B46, wherein the customized store layout is selected based at least in part on localized customer desires and/or localized demand.

B48. The method of B19, wherein the planogram incorporates corporate-level business rules and/or best practices pertaining to product placement.

B49. The method of B19, further comprising:
obtaining sales data corresponding to at least one of the one or more inventory items, the sales data stored in a database;
calculating a performance metric corresponding to at least one of the one or more inventory items; and
characterizing the at least one of the one or more inventory items to the planogram based at least in part on the performance metric, the planogram comprising a modification to one or more of:
the location corresponding to the at least one of the one or more inventory items in the scene;
the quantity corresponding to the at least one of the one or more inventory items in the scene;
the facing arrangement corresponding to the at least one of the one or more inventory items in the scene;
the floor layout corresponding to the at least one of the one or more inventory items in the scene; and
the fixture attribute corresponding to the at least one of the one or more inventory items.

B50. The method of B49, wherein the metric comprises one or more of: sales value; gross margin; profit margin; inventory turn; customer conversion ratio; shelf space; and items per purchase.

B51. The method of B19, wherein the user captures the one or more images using the imaging device while working in a retail environment in which the one or more inventory items are sold, the working at least in part comprising a task customarily performed by a worker in the retail environment.

B52. The method of B19, wherein the imaging device comprises a camera and/or a scanner.

B53. The method of B19, further comprising receiving one or more manual inputs from a hand-operated input device, and wherein the planogram is based at least in part on the one or more manual inputs.

B54. The method of B19, further comprising providing a workflow to the user while the user is working in a retail environment in which the one or more inventory items are sold, the workflow configured to direct the user to:

capture the one or more images using the imaging device while working in the retail environment; and/or provide the one or more utterances using the voice recognition system;

wherein the working at least in part comprising a task customarily performed by a worker in the retail environment.

B55. The method of B54, wherein the workflow comprises a voice directed workflow, the voice directed workflow provided by an audio headset.

B56. The method of B54, wherein the workflow comprises a visually directed workflow, the visually directed workflow provided on a screen of a mobile device.

B57. The method of B19, wherein the location corresponding to the at least one of the one or more inventory items in the scene is unavailable from any database resource prior to receiving the one or more images and/or prior to receiving the one or more utterances.

B58. The method of B54, wherein the workflow is prepared in advance based at least in part on known attributes of the retail environment.

B59. The method of B54, wherein the workflow is generated in real-time while the user is working in a retail environment in which the one or more inventory items are sold.

B60. The method of B19, further comprising using the one or more images and/or the one or more utterances to generate a workflow in real-time while the user is working in a retail environment in which the one or more inventory items are sold.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of characterizing an inventory item to a planogram, the method comprising:

receiving an image using an imaging device, the image comprising a view of a scene including an inventory item and an indicia for the inventory item, the indicia comprising an identification code configured to identify the inventory item;

receiving an utterance from a user using a voice recognition system, the utterance comprising a spoken description of the inventory item;

identifying the inventory item in the scene and the identification code corresponding to the identified inventory item, wherein the identifying is based on the image and on the utterance;

identifying an attribute corresponding to the inventory item, the attribute identified based on the image and the utterance;

calculating a performance metric corresponding to the inventory item, wherein the performance metric comprises at least one of a gross margin, a profit margin, an inventory turn, a customer conversion ratio, a shelf space and an item per purchase;

characterizing the inventory item to generate a planogram based on the performance metric, the identification code and the attribute;

wherein the identification code is identified from the image during planogram generation; and wherein the attribute of the inventory item identified from the image and the user utterance received are used for characterizing of the inventory item during the planogram generation.

2. The method of claim 1, wherein the image comprising the view of the scene comprises of:

a location corresponding to the inventory item in the scene;

a quantity corresponding to the inventory item in the scene;

a facing arrangement corresponding to the inventory item in the scene;

a floor layout corresponding to the inventory item in the scene;

a fixture attribute corresponding to the inventory item in the scene; and an identification code corresponding to the inventory item in the scene.

3. The method of claim 1, wherein the utterance comprises at least one of:

a location corresponding to the inventory item in the scene;

a quantity corresponding to the inventory item in the scene;

a facing arrangement corresponding to the inventory item in the scene;

a floor layout corresponding to the inventory item in the scene;

a fixture attribute corresponding to the inventory item in the scene; and an identification code corresponding to the inventory item.

4. The method of claim 1, wherein the attribute comprises at least one of:

a location corresponding to the inventory item;

a quantity corresponding to the inventory item;

a facing arrangement corresponding to the inventory item;

a floor layout corresponding to the inventory item; and a fixture attribute corresponding to the inventory item.

5. The method of claim 1, wherein the planogram comprises:

a visual representation of the scene, the visual representation based is on the image and the utterance;

a description of the inventory item in the scene, the description comprising a visual representation of the inventory item and/or a textual description of the inventory item, wherein the description is based on the utterance; and a description of the attribute corresponding to the inventory item, the description comprising a visual representation of the attribute and a textual description of the attribute.

6. The method of claim 1, wherein a description of the inventory item in the scene comprises an identification code corresponding to inventory item in the scene.

7. The method of claim 1, wherein a description of the attribute corresponding to the inventory item comprises the description of:
- a location corresponding to inventory item in the scene, the description of the location comprising a visual representation of the location and/or a textual description of the location;
- a quantity corresponding to the inventory item in the scene, the description of the quantity comprising a visual representation of the quantity and/or a textual description of the quantity;
- a facing arrangement corresponding to the inventory item in the scene, the description of the facing arrangement comprising a visual representation of the facing arrangement and/or a textual description of the facing arrangement;
- a floor layout corresponding to inventory item in the scene, the description of the floor layout comprising a visual representation of the floor layout and/or a textual description of the floor layout; and
- a fixture attribute corresponding to the inventory item, the description of the fixture attribute comprising a visual representation of the fixture attribute and/or a textual description of the fixture attribute.

8. The method of claim 1, comprising identifying a first inventory item based on the image and the utterance.

9. The method of claim 1, comprising identifying a first inventory item based on the image and identifying a second inventory item based the utterance.

10. The method of claim 1, comprising identifying a first inventory item based on the image and identifying an identification code corresponding to the first inventory item based on the utterance.

11. A method of characterizing one or more inventory items to a planogram, the method comprising:
- receiving an image using an imaging device, the image comprising a view of a scene including an inventory item and at least one of:
  - an indicia for the inventory item, each indicia comprising an identification code configured to identify a respective inventory item;
  - a location corresponding to the inventory item in the scene;
  - a quantity corresponding to the inventory item in the scene;
  - a facing arrangement corresponding to the inventory item in the scene;
  - a floor layout corresponding to the inventory item in the scene; and
  - a fixture attribute corresponding to the inventory item in the scene;
- receiving an utterance from a user using a voice recognition system, the utterance comprising a spoken description of:
  - at least the inventory item;
  - a location corresponding to the inventory item in the scene;
  - a quantity corresponding to the inventory item in the scene;
  - a facing arrangement corresponding to the inventory item in the scene;
  - a floor layout corresponding to the inventory item in the scene;
  - a fixture attribute corresponding to the inventory item in the scene; and
  - an identification code corresponding to the inventory item;
- identifying the inventory item in the scene based on the image and utterance;
- identifying an attribute corresponding to the inventory item, the attribute identified based on the image and the utterance, wherein the attribute comprises at least one of:
  - a location corresponding to a respective inventory item;
  - a quantity corresponding to a respective inventory item;
  - a facing arrangement corresponding to a respective inventory item;
  - a floor layout corresponding to a respective inventory item; and
  - a fixture attribute corresponding to a respective inventory item; and
- calculating a performance metric corresponding to the inventory item, wherein the performance metric comprises at least one of a gross margin, a profit margin, an inventory turn, a customer conversion ratio, a shelf space and an item per purchase;
- characterizing the inventory item to generate a planogram based on the performance metric, the identification code and the respective attribute, wherein the identification code is identified from the image during planogram generation, and the generated planogram comprises of:
  - a visual representation of the scene, the visual representation based on the image and on the utterance;
  - a description of the inventory item in the scene and of the corresponding identification code, the description comprising a visual representation of the inventory item and/or a textual description of the inventory item, wherein the description is based on the utterance; and
  - a description of placement of the inventory item in the scene, the placement being in respect of at least one of the following attribute respectively corresponding to the inventory item:
    - a location corresponding to inventory item in the scene, the description of the location comprising a visual representation of the location and/or a textual description of the location;
    - a quantity corresponding to inventory item in the scene, the description of the quantity comprising a visual representation of the quantity and/or a textual description of the quantity;
    - a facing arrangement corresponding to inventory item in the scene, the description of the facing arrangement comprising a visual representation of the facing arrangement and/or a textual description of the facing arrangement;
    - a floor layout corresponding to inventory item in the scene, the description of the floor layout comprising a visual representation of the floor layout and/or a textual description of the floor layout; and
    - a fixture attribute corresponding to inventory item in the scene, the description of the fixture attribute comprising a visual representation of the fixture attribute and/or a textual description of the fixture attribute.

12. The method of claim 11, further comprising identifying a first inventory item based on the image and identifying an identification code corresponding to the first inventory item based on the utterance.

13. The method of claim 11, further comprising initiating the method by providing a prompt configured to instruct the user to characterize the inventory item.

14. The method of claim 13, wherein the prompt comprises an audible prompt, the audible prompt comprising an identification of the inventory item.

15. The method of claim 11, further comprising providing a prompt configured to instruct the user to characterize the inventory item upon identifying the inventory item in the scene based on the image.

16. The method of claim 11, further comprising capturing the image using the imaging device upon receiving the utterance from the user using the voice recognition system.

17. The method of claim 11, further comprising receiving coordinates corresponding to one or more of:
- the location for the inventory item;
- the facing arrangement for the inventory item; and
- the floor layout for the inventory item.

18. The method of claim 17, wherein the coordinates comprise geoposition coordinates.

19. The method of claim 17, wherein the coordinates are generated using a Wi-Fi positioning system.

20. The method of claim 17, wherein the coordinates are generated using the image comprising the view of the scene.

* * * * *